Figures 1, 2:
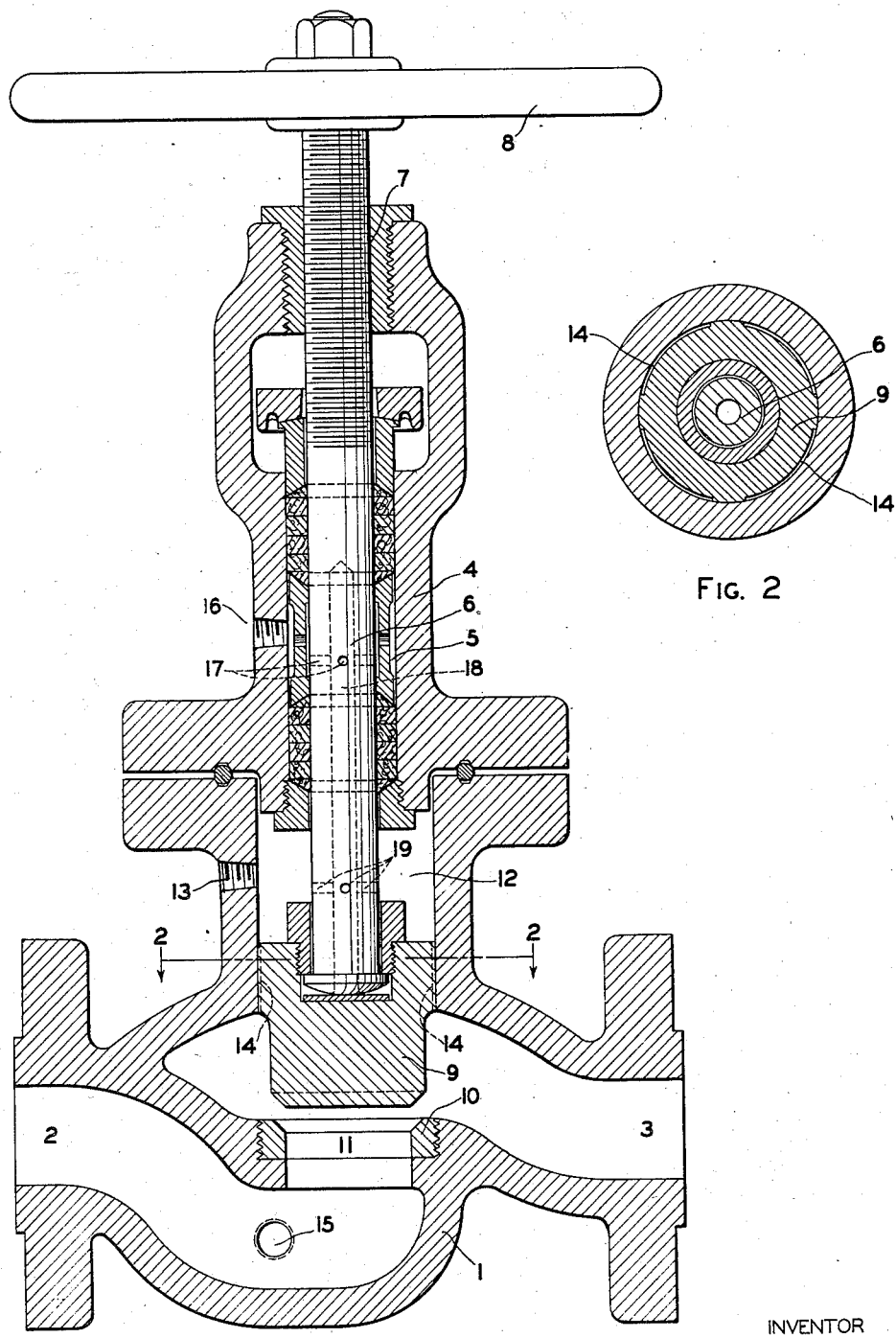

Feb. 4, 1936. W. R. KINNAIRD 2,029,777
VALVE
Filed Dec. 23, 1933

INVENTOR
WILLIAM R. KINNAIRD
BY
ATTORNEY

Patented Feb. 4, 1936

2,029,777

UNITED STATES PATENT OFFICE 2,029,777

VALVE

William R. Kinnaird, Chicago, Ill., assignor to Universal Oil Products Company, Chicago, Ill., a corporation of Delaware Application December 23, 1933, Serial No. 703,690

7 Claims. (Cl. 251—20)

This invention relates to improvements in valves for the control of fluids, specifically adapted to controlling the flow of hot hydrocarbon oils or other heated fluids which have a tendency to deposit coke or otherwise hinder the operation of ordinary valves.

In the refining of hydrocarbon oils and particularly in processes directed to their pyrolytic conversion, it is often desirable to reduce the pressure between different portions of the apparatus by employing a pressure reducing valve in the conduit connecting said different portions of the apparatus through which conduit a stream of highly heated hydrocarbon oil is continuously passed. It has been the practice to employ, for such service, a hand operated globe-type valve designed for high-temperature and high pressure service, but difficulties have been encountered with such valves due to the tendency of the heated oil to deposit coke within the valve, which greatly hinders operation of the moveable valve member. In many cases it is desirable to partially cool the stream of heated hydrocarbon oil simultaneous with the reduction in pressure thereon and injection of a suitable cooling fluid such as cooler hydrocarbon oil into the valve or into the stream of heated hydrocarbon oil just ahead of the valve (on the high pressure side) will, in many cases, serve to greatly minimize or prevent obstruction of the valve port so that the continuous flow of oil through the valves is insured. Even in such cases, however, there is still a tendency for coke to accumulate around the valve bonnet between the valve stem and moveable seating member and the main body of the valve. This may not materially obstruct the passage of oil through the valve but greatly hinders and in most cases eventually prevents changing the position of the moveable seating member. The position of the moveable seating member must be changed from time to time during the operation of the process in order to maintain a fairly constant outlet pressure from the valve and in most cases occasional movement of the moveable seating member will break away accumulations of coke between the moveable and the stationary seating members and greatly prolong the operation of the process before it is necessary to shut down, due to restriction or actual obstruction to the flow of oil through the valve.

The present invention is directed to an improved valve which is particularly adapted to the type of service above described, although its use is by no means limited to this class of service since the valve may be employed to advantage in any service wherein it is desirable to cool and/or lubricate the moveable seating member.

The present invention briefly described comprises a chamber for cooling fluid and/or lubricant provided between the moveable seating member of the valve and the valve bonnet. The moveable seating member is slidably positioned between the walls of said chamber, the walls serving as a guide for said member. Ports or channels are provided about the outer circumference of the moveable seating member, permitting the passage of cooling fluid and/or lubricant from the chamber into the stream of fluid passing through the valve and means are provided for introducing cooling fluid and/or lubricant to said chamber and therefrom into the main stream of fluid passing through the valve.

The accompanying diagrammatic drawing illustrates one specific form of the apparatus of the present invention, the features of which will be more clearly understood from the following description of the drawing.

Figure 1 of the drawing illustrates a longitudinal section through the valve.

Figure 2 is a cross-section taken through the upper portion of the main body of the valve and the moveable seating member along a plane indicated by the line 2—2 in Figure 1.

Referring in detail to the drawing, the main body of the valve is indicated at 1, 2 being the inlet and 3 the outlet. The valve bonnet is indicated at 4 and is provided with a suitable stuffing box 5. The particular valve here illustrated has a rising stem 6, threaded through the upper portions of the valve bonnet, as indicated at 7, and provided at its upper end with a hand wheel 8. The lower end of the valve stem is rotatably attached to the moveable seating member 9, the position of which, relative to the stationary seating member 10, having port 11, regulates the flow of fluid through the valve.

The upper portion of the main body of the valve forms a chamber or reservoir 12 for suitable cooling fluid and/or lubricant which may be introduced thereto through a suitable opening, such as 13, provided in this portion of the valve. The upper portion of the moveable seating member 9 fits snugly between the cylindrical walls of chamber 12 and may be raised and lowered within the chamber by the rotation of hand wheel 8 and valve stem 6.

As indicated in Figs. 1 and 2, slotted ports 14 are provided around the outer circumference of the upper portion of moveable seating member 9 to permit the flow of the cooling fluid and/or lubricant from chamber 12 into the main body of the valve and into the stream of heated oil or other fluid passing therethrough.

It is also specifically within the scope of the present invention to employ cooling fluid around valve stem 6 where it passes through the stuffing box 5 in order to keep the packing cool and lubricate the stem. A port 16 is provided in the valve bonnet to permit the introduction of cooling fluid to this portion of the valve and, when desired, stem 6 may be drilled, as indicated, at 17, 18 and 19 to permit the transfer of cooling fluid introduced to the stuffing box through port 16 through the valve stem into reservoir 12. In such cases the introduction of cooling fluid to reservoir 12 through port 13 may, when desired, be eliminated.

Pressure somewhat greater than that maintained on the outlet side of port 11 may be employed in chamber 12 in order to insure the flow of cooling fluid and/or lubricant through ports 14, as previously described. This may be accomplished, for example, by supplying the cooling fluid and/or lubricant to chamber 12 from storage under pressure or by means of a suitable pump, for example, although such means are not shown in the drawing.

By providing a chamber for cooling fluid and/or lubricant above the movable seating member of the valve and by providing for the flow of the cooling fluid and/or lubricant around the moveable seating member, as provided by the present invention, the moveable seating member is cooled and/or lubricated and any cooling fluid passing through the ports provided in the moveable seating member into the stream of heated fluid passing through the valve serves to cool the heated fluid in a zone immediately surrounding the moveable seating member in order to prevent the formation and accumulation of coke in this zone and prevent sticking of the moveable seating member.

A suitable opening such as indicated, for example, at 15 may also be provided in the main body of the valve for introducing suitable cooling fluid into the stream of heated fluid passing through the valve in order to partially cool the same, prior to its passage through port 11, and assists in preventing the accumulation of coke in the main body of the valve and particularly between the moveable and stationary seating members.

It will be understood that the present invention is not limited to the specific form or type of valve illustrated and above described, since the features of the present invention are equally well adapted to use in needle valves, gate valves, other types of globe valves and various modifications of such types as well as automatic pressure reducing valves of any form.

I claim as my invention:

1. A valve for controlling the flow of fluids comprising in combination, a main valve body having inlet and outlet ports and a fluid passageway through said body connecting said ports, a moveable seating member for controlling the passage of fluid through said passageway, a fluid reservoir within said main body adjacent the moveable seating member but outside the flow of fluid through said passageway, means for conducting cooling fluid into said reservoir, said moveable seating member being provided with means whereby said cooling fluid may pass around the moveable seating member into said fluid passageway.

2. A valve for controlling the flow of fluids comprising in combination, a valve body, a moveable member within said body for controlling the flow of fluid through a fluid passageway in said body said moveable member separating said passageway from the remaining hollow portion of said body, means for conducting cooling fluid to said remaining hollow portion, said moveable member being provided with means whereby said cooling fluid may pass around said moveable member into said fluid passageway.

3. A valve for controlling the flow of fluids comprising, in combination, a main valve body having inlet and outlet ports, a stationary seating member within the main valve body having a port through which a main stream of fluid flowing through the valve may pass, a moveable seating member for controlling said flow through said port, means for adjusting the position of the moveable seating member relative to the stationary seating member, said valve body being provided with a fluid chamber located outside the path of flow of said main stream of fluid passing through the valve, within which chamber the moveable seating member is mounted, means for conducting a fluid into said chamber and means for conducting fluid from said chamber into the main stream of fluid passing through the valve.

4. A valve for controlling the flow of fluids comprising, in combination, a main valve body having inlet and outlet ports, a stationary seating member within the main valve body having a port through which a main stream of fluid flowing through the valve may pass, a movable seating member in adjustable relation to the stationary seating member, means for adjusting the position of the movable seating member relative to the stationary seating member whereby to control the flow of fluid through the valve, said valve body being provided with a fluid chamber located outside the path of flow of said main stream of fluid passing through the valve, within which chamber the movable seating member is mounted, means for conducting a fluid into said chamber and, means for passing fluid from said chamber around the movable seating member into the main stream of fluid passing through the valve.

5. A valve for controlling the flow of fluids comprising, in combination, a main valve body having inlet and outlet ports, a stationary seating member within the main body having a port through which a main stream of fluid flowing through the valve may pass, a movable seating member in adjustable relationship to the stationary seating member, means for adjusting the position of the movable seating member relative to the stationary seating member whereby to control the flow of fluid through the valve, said valve body being provided with a fluid chamber located outside the path of flow of said main stream of fluid passing through the valve, within which chamber the movable seating member is mounted, means for conducting a fluid into said chamber, said movable seating member being provided with means comprising ports on its outer periphery for permitting the passage of fluid from said chamber between the movable seating member and the walls of said chamber into the main stream of fluid passing through the valve.

6. A valve for controlling the flow of fluids comprising, in combination, a main valve body having inlet and outlet ports, a stationary seating member within the main valve body having a port through which a main stream of fluid flowing through the valve may pass, a movable seating member in adjustable relation to the stationary seating member, means for adjusting the position of the movable seating member relative to the stationary seating member whereby to control the flow of fluid through the valve, means for conducting a cooling fluid into the main stream of fluid flowing through the valve, prior to its passage through the port in said stationary seating member, a fluid chamber located outside the path of flow of said main stream of fluid passing through the valve, within which chamber the movable seating member is mounted, means for conducting a fluid into said chamber, said movable seating member being provided with means comprising ports on its outer periphery whereby fluid may pass from said chamber into the main stream of fluid passing through the valve.

7. A valve for controlling the flow of fluids comprising, in combination, a main valve body having inlet and outlet ports, a stationary seating member within the main valve body having a port through which a main stream of fluid flowing through the valve may pass, a movable seating member for controlling said flow through said port, means for adjusting the position of the movable seating member relative to the stationary seating member, said valve body being provided with a fluid chamber located outside the path of flow of said main stream of fluid passing through the valve, within which chamber the movable seating member is mounted, means for conducting a cooling fluid into said chamber and means for conducting cooling fluid from said chamber around said movable member.

WILLIAM R. KINNAIRD.